United States Patent [19]
Chuang

[11] Patent Number: 5,632,026
[45] Date of Patent: May 20, 1997

[54] SYSTEM AND METHOD FOR MANAGING THE ROUTINE EXECUTION IN A COMPUTER SYSTEM

[75] Inventor: Te-Chih Chuang, Maio-Lee Shyuan, Taiwan

[73] Assignee: Acer Incorporated, Taiwan

[21] Appl. No.: 396,380

[22] Filed: Feb. 28, 1995

Related U.S. Application Data

[63] Continuation of Ser. No. 226,512, Dec. 6, 1993, abandoned, which is a continuation of Ser. No. 689,331, Apr. 22, 1991, abandoned.

[51] Int. Cl.$^6$ ........................................ G06F 12/16
[52] U.S. Cl. .................. 395/490; 395/445; 395/462; 380/4
[58] Field of Search ........................ 395/400, 425, 395/429, 430, 431, 490, 440, 445, 462, 471, 473, 479, 493, 497.02, 497.03, 497.04; 380/4

[56] References Cited

U.S. PATENT DOCUMENTS

| | | | |
|---|---|---|---|
| 4,426,682 | 1/1984 | Riffe et al. | 395/425 |
| 4,654,819 | 3/1987 | Stiffler et al. | 395/425 |
| 4,819,154 | 4/1989 | Stiffler et al. | 395/575 |
| 5,095,428 | 3/1992 | Walker et al. | 395/425 |
| 5,097,532 | 3/1992 | Borup et al. | 395/425 |
| 5,146,603 | 9/1992 | Frost et al. | 395/425 |
| 5,210,850 | 5/1993 | Kelly et al. | 395/725 |

*Primary Examiner*—Eddie P. Chan
*Assistant Examiner*—Hiep Nguyen
*Attorney, Agent, or Firm*—Townsend and Townsend and Crew LLP

[57] ABSTRACT

A computer program management system having a first memory device containing firmware, a shadow processing device for copying the firmware from the first memory device to a shadow region of a system memory device, a cache RAM, and a flush device. Firmware is copied from the shadow region of the system memory device to the cache RAM for execution by the CPU. If an attempt is made to write to the shadow region of the system memory device, the flush device causes the CPU to flush the contents of the cache RAM.

Alternatively, the system may have a first memory device containing firmware, a shadow processing device for copying the firmware from the first memory device to a shadow region of a system memory device, a cache RAM, and a disabling device. In this embodiment of an attempt is made to write to the shadow region of the system memory device, the disabling device causes the CPU to prevent the data from being written to the cache RAM.

8 Claims, 6 Drawing Sheets

SYSTEM AND METHOD FOR MANAGING THE ROUTINE EXECUTION IN A COMPUTER SYSTEM

This is a continuation of application Ser. No. 08/226,512 filed Dec. 6, 1993, now abandoned, which is a continuation of Ser. No. 07/689,311, filed Apr. 22, 1991, now abandoned.

BACKGROUND OF THE INVENTION

1. Field of the Invention

This invention relates to a system and method for managing computer programs in a computer system, and more particularly to a system and method for using both shadow memory and cache memory to execute programs which the system stores in read only memory.

2. Description Of the Prior Art

Figure 2:
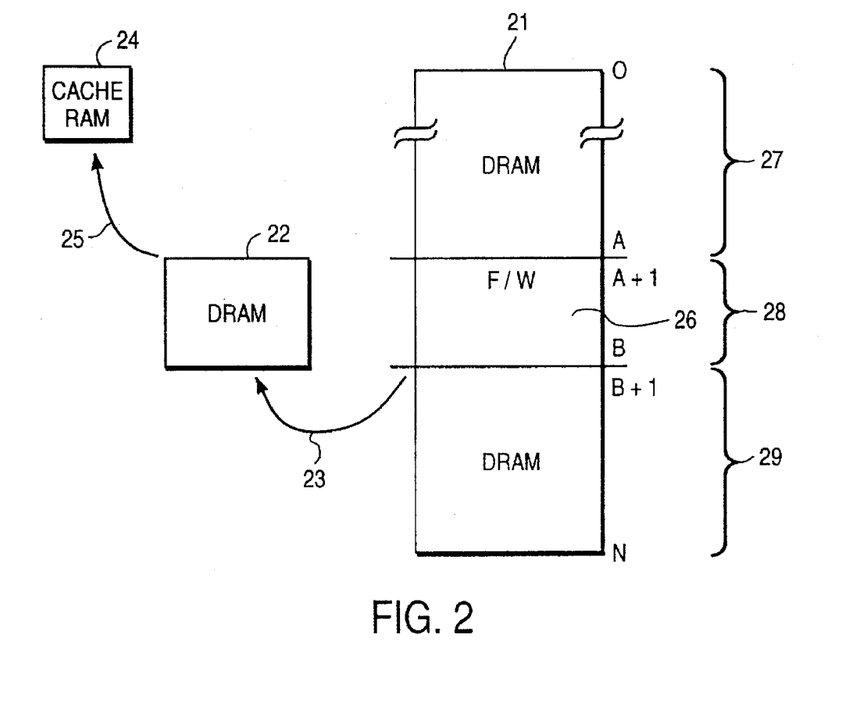
FIG. 2 is a block diagram showing the system memory map, and the use of the shadow method, and the cache RAM method as part of this memory device.

In a personal computer system containing a 486 series microprocessor, the primary components include the following: dynamic random access memory (DRAM), one read-only memory (ROM) for storage of firmware (F/W), and a central processor unit (CPU) with cache RAM. The system memory address space is allocated as shown in FIG. 2. The first address space 27, consisting of the memory from address 0 to address Ar is implemented as dynamic random access memory (DRLM) and is therefore cacheable. A second address space 28, defined as the memory region from address A+1 to address B contains firmware 26, and is implemented as ROH which has been non-cacheable in the prior art. A third address space 29, defined as the memory region from address B+1 to address N, is also implemented as dynamic random access memory (DRAM), and is therefore also cacheable. The firmware 26 in the second address space 28 can be shadowed according to a conventional shadowing method 23 by copying it into an external DRAM used as a shadow memory device 22. The steps of the conventional shadowing method are as follows: (a) Copy the firmware 26 from the ROM at the second address space 28 into an external shadow memory device 22; (b) Control the hardware so that all accesses of the second address space 28 will be directed to the external shadow memory device 22, instead of the ROM; and (c) Put the shadow memory device 22 into a write-protect mode.

A drawback of the conventional technique is that the data in shadow memory device 22 cannot be further copied into another cache RAM 24 according to a cache RAM method 25 because there is no conventional technique for maintaining data consistency between the firmware 26 stored in both the shadow memory device 22 and the cache RAM 24.

SUMMARY OF THE INVENTION

In accordance with the present invention, a method and system of managing computer programs is provided which determines whether an attempt is being made to write data into the address range occupied by a shadow system memory device, and if so, a signal is generated which causes the cache RAM to be flushed. In an alternate embodiment, a signal is generated which disables the write to the cache RAM. Consequently, in either embodiment of the present invention, both shadow memory and cache memory may be used to increase the speed of execution of firmware 26 without ever having the system in a state where the copy of firmware 26 in cache RAM does not exactly match the copy residing in the shadow memory.

DESCRIPTION OF THE PREFERRED EMBODIMENT

Figure 1:
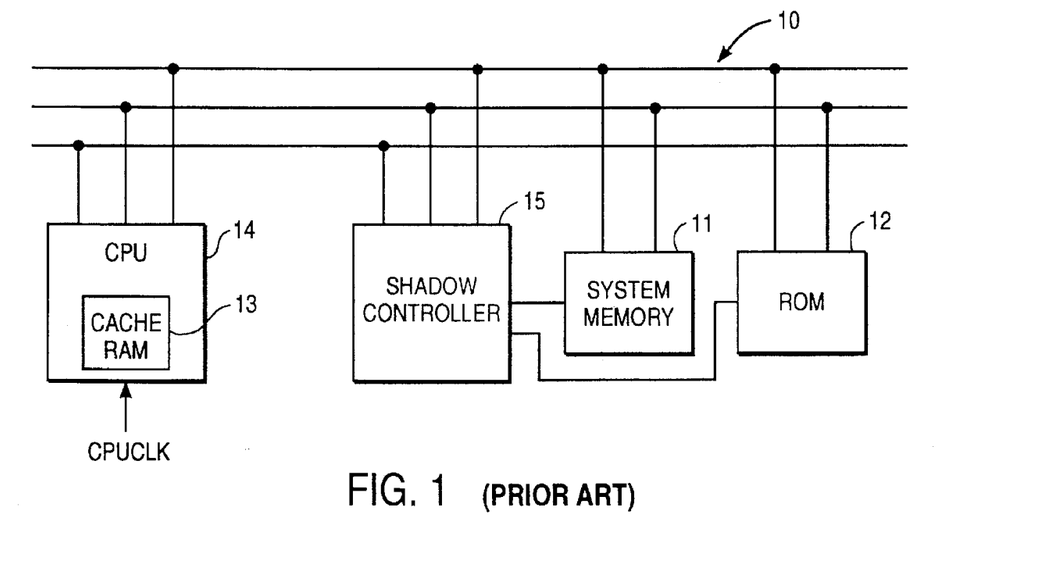
FIG. 1 is a block diagram of a conventional computer system containing a cache RAM and a shadow memory device.

In FIG. 1, the primary components of a conventional computer 10 are as follows: system memory device 11, one read-only memory (ROM) device 12 for storing firmware 26 (F/W), one central processing unit (CPU) 14 containing a cache RAM 13, and a shadow controller 15.

As shown in FIG. 2, a first address space 27, defined as the memory region from address 0 to address A, is implemented as dynamic random access memory (DRAM) and is therefore cacheable. A second address space 28, defined as the memory region from address A+1 to address B, contains firmware 26 and is implemented as ROM which has been non-cacheable in the prior art. A third address space 29, defined as the memory region from address B+1 to address N, is also implemented as DRAM, and is therefore also cacheable. By utilizing the conventional shadow method 23, the firmware located in the second address space 28 can be copied to external shadow memory device DRAM 22. The steps of the conventional shadowing method are as follows:

1. Copy the firmware 26 from the ROM at the second address space 28 into an external shadow memory device 22;

2. Control the hardware so that all accesses of the second address space 28 will be directed to the external shadow memory device 22, instead of the ROM; and 3. Put the shadow memory device 22 into a write-protect mode.

A drawback of the conventional technique is that the data in shadow memory device 22 cannot be further copied into cacheable RAM 24 according to a cache RAM method 25 because there is no conventional technique for maintaining data consistency between the firmware 26 stored in both the shadow memory device 22 and the cache RAM 24.

Figure 3A:
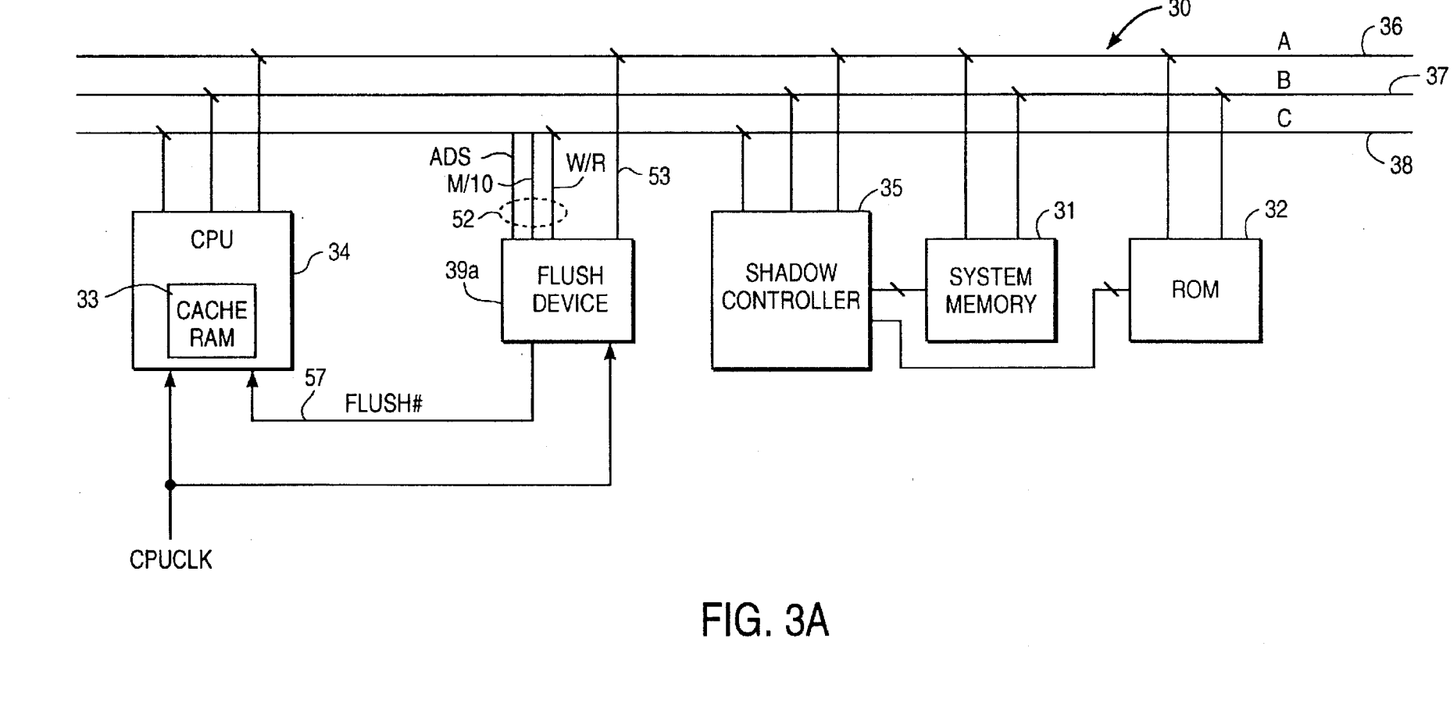
FIG. 3A is a block diagram of a computer system including the system and method of a first embodiment of the present invention.

In a first embodiment of the present invention, shown in FIG. 3A, the main components of the microprocessor system 30 include a central processing unit (CPU) 34 containing a cache RAM 33, one shadow control device 35, one system memory retrieval device 31, one read-only memory (ROM) device 32 containing the firmware 26, and a flush device 39A. Connections between them include an address bus 36, data bus 37, and control bus 38.

With reference to FIGS. 2 and 3A, the novel method of managing a computer program in accordance with a first embodiment of the present invention comprises the following steps:

1. Copy the firmware 26 from the ROM 32 into the system memory device 31 by using the conventional shadow method 23;

2. Copy some of the firmware 26 from the shadow portion of system memory device 31 into cache RAM 33 by using the conventional cache PJLM method 25;

3. Determine whether a request has been made to write into the shadow portion of the system memory device 31 (i.e., into the address range A+1 to B), and if a request has been so made, generate a flush signal 57 to flush the data which was copied to cache RAM 33.

In a second embodiment of the present invention, a second method for managing computer programs is provided which includes the following steps:

1. Copy the firmware 26 from the ROM 32 into the system memory device 31 by using the conventional shadow method 23;

2. Copy some of the firmware 26 from the shadow portion of system memory device 31 into cache RAM 33 by using the conventional cache RAM method 25; and 3. Determine whether a request has been made to write into the shadow portion of system memory device 31 (i.e., into the address range A+1 to B), and if a request has been so made, generate a disable signal 77 (EADS#) which prevents any write to the cache RAM 33 from taking place.

Figure 5:
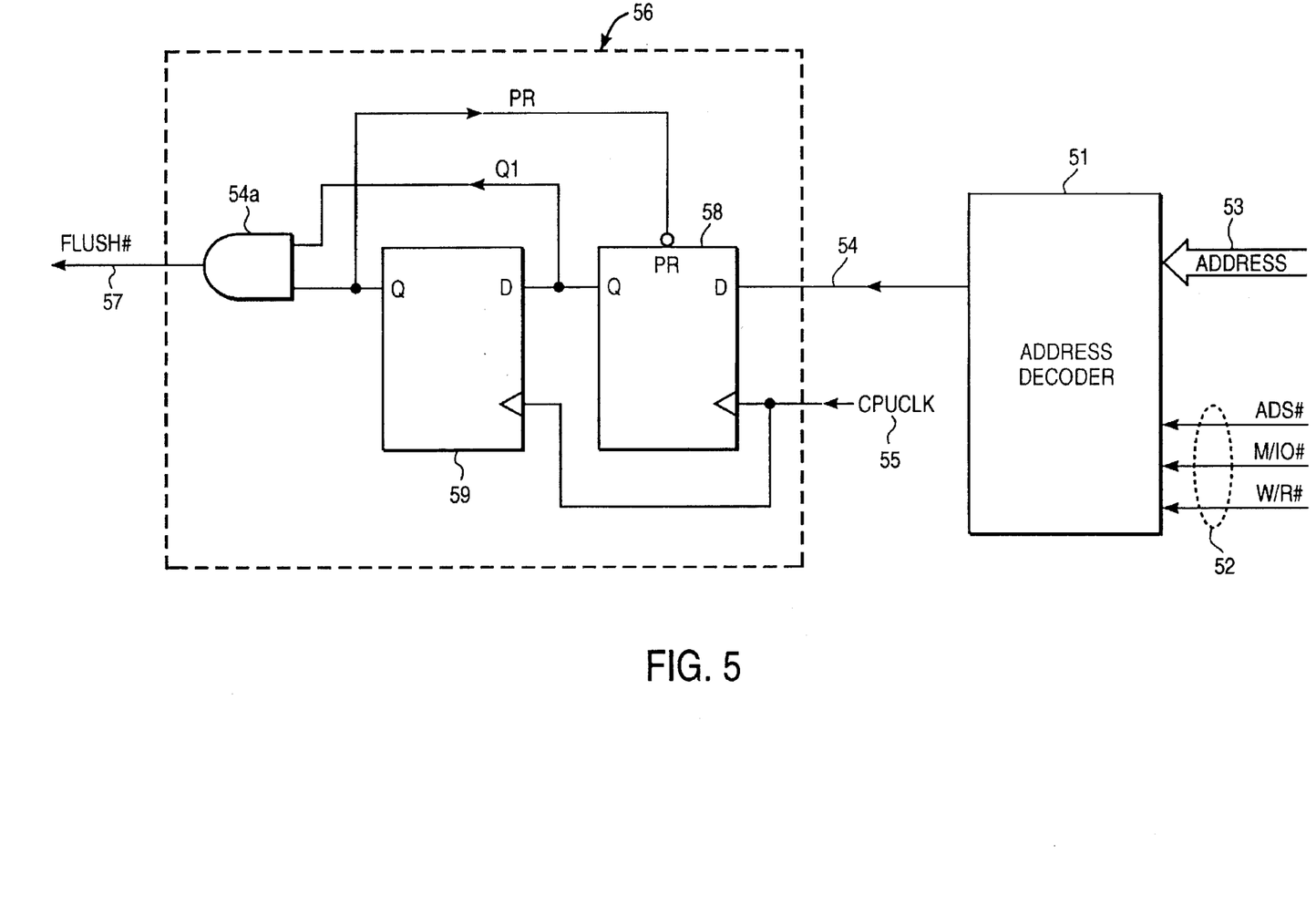
FIG. 5 is a circuit diagram of a flush device in accordance with a first embodiment of the present invention.

Referring to FIGS. 2, 3A, and 5, in order to generate a flush signal 57 (FLUSH#) as used in the above-described first method, a first embodiment of a microprocessor system 30 must include the following elements:

1. A shadow control device 35 which performs the steps necessary to copy the firmware 26 from the ROM 32 to the system memory device 31 in accordance with the conventional shadowing method 23;

2. A CPU 34 which copies some of the firmware 26 from the system memory device 31 to the cache RAM 33 by using the conventional cache RAM method 25; and 3. A flush device 39A which determines whether a request has been made to write into the shadow portion of the system memory device 31 (i.e., into the address range A+1 to B), and if a request has been so made, generates a flush signal 57 to flush the data which was copied to cache RAM 33

Details of the preferred embodiment of the above-mentioned flush device 39A are shown in FIG. 5.

Control bus 52 contains an address state signal (ADS#), a signal (M/IO#) for distinguishing between memory and input/output operations, and a signal (W/R#) for distinguishing between write and read operations. The address bus 53 carries address signals. The address bus 53 and the control bus 52 are both input into address decoder 51, which is constructed from a programable array logic (PAL) device. The address decoder 51 generates the decoding signal 54 which is active when address decoder 51 detects that a write to the shadow range (i.e., from address A+1 to B) of the system memory device 31 is being attempted.

Signal adjustment device 56 includes a first flip-flop 58, a second flip-flop 59, and an AND gate 54A. It accepts, as inputs, the decoding signals 54 and the CPU clock signal 55, and generates a flush signal 57 which meets the timing specifications of the CPU 34. When it is active, the flush signal 57 causes the CPU 34 to flush the contents of cache RAM 33.

Figure 4:
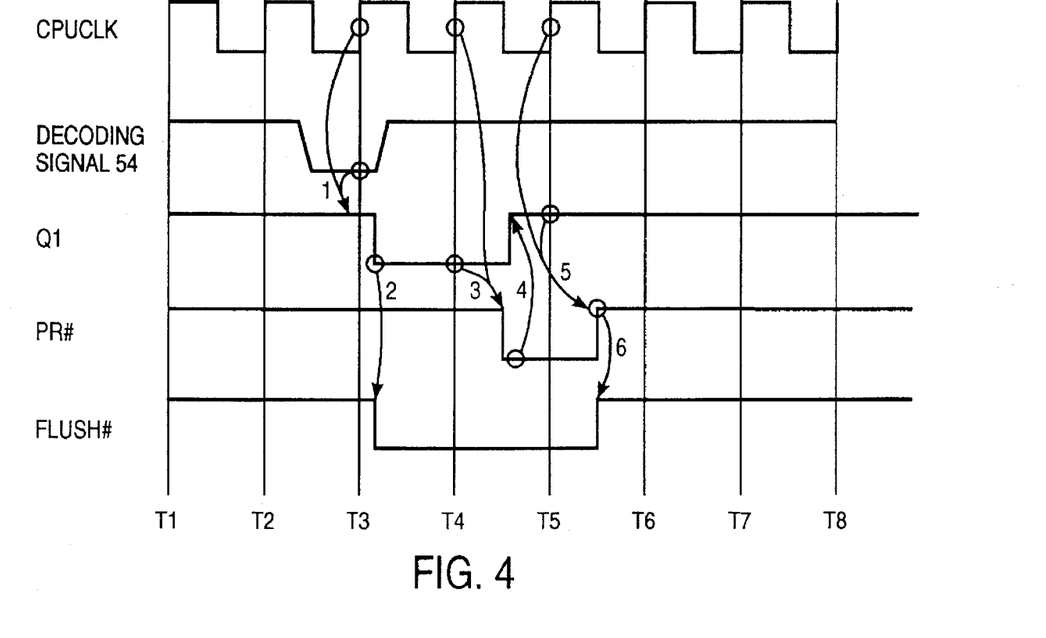
FIG. 4 is a timing diagram showing the signals generated by a flush device in accordance with a first embodiment of the present invention.

The signals generated by the signal adjustment device 56 are shown in FIG. 4, and will now be described. When the decoding signal 54 is inactive it has a high value which is clocked into the first flip-flop 58 and then the second flip-flop 59. As long as the decoding signal 54 remains high, both flip-flops will have high values, causing the flush signal 57, which is the output of AND gate 54A, to remain high (inactive).

When the address decoder 51 detects a write to the shadow range (i.e., from address A+1 to B) of the system memory device 31, decoding signal 54 goes low. At the next rising edge of the CPU clock signal 55 (T3 in FIG. 4), the value of the decoding signal 54 is clocked into the first flip-flop 58, causing its output, Q1, to go low. This low Q1 value causes the flush signal 57, which is the output of AND gate 54A, to go low (active)

Sometime after T3 but before T4, the decoding signal 54 returns to its inactive (high) state. On the next rising edge of the CPU clock signal 55 (T4 in FIG. 4), the low output (Q1) of the first flip-flop 58 is clocked into the second flip-flop 59, causing its output (PR) to fall. This low value of PR causes the output of AND gate 54A (i.e., the flush signal 57) to remain low. Furthermore, this low value of PR is fed back to the preset input of the first flip-flop 58, causing Q1 to immediately rise to a high level. At the next rising edge of the CPU clock signal 55, this high value of Q1 is clocked into the second flip-flop 59, causing PR to rise. At the same time, the high value of decoding signal 54 is clocked into the first flip-flop 58, causing its output, Q1, to remain high. The high values of both Q1 and PR cause the output of AND gate 54A to rise, making the flush signal 57 high (inactive). This is shown occurring between times T5 and T6 in FIG. 4.

Figure 3B:
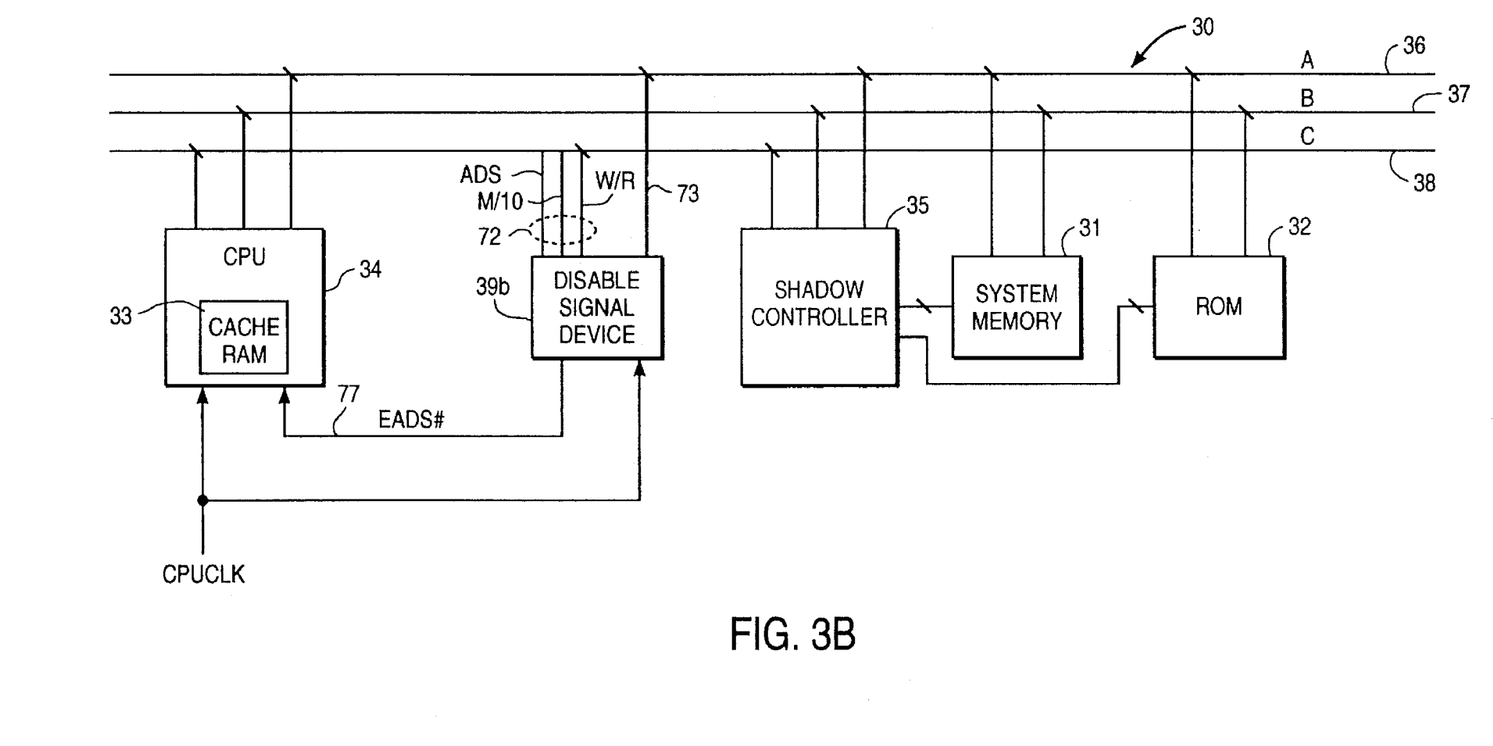
FIG. 3B is a block diagram of a computer system including the system and method of a second embodiment of the present invention.
Figure 7:
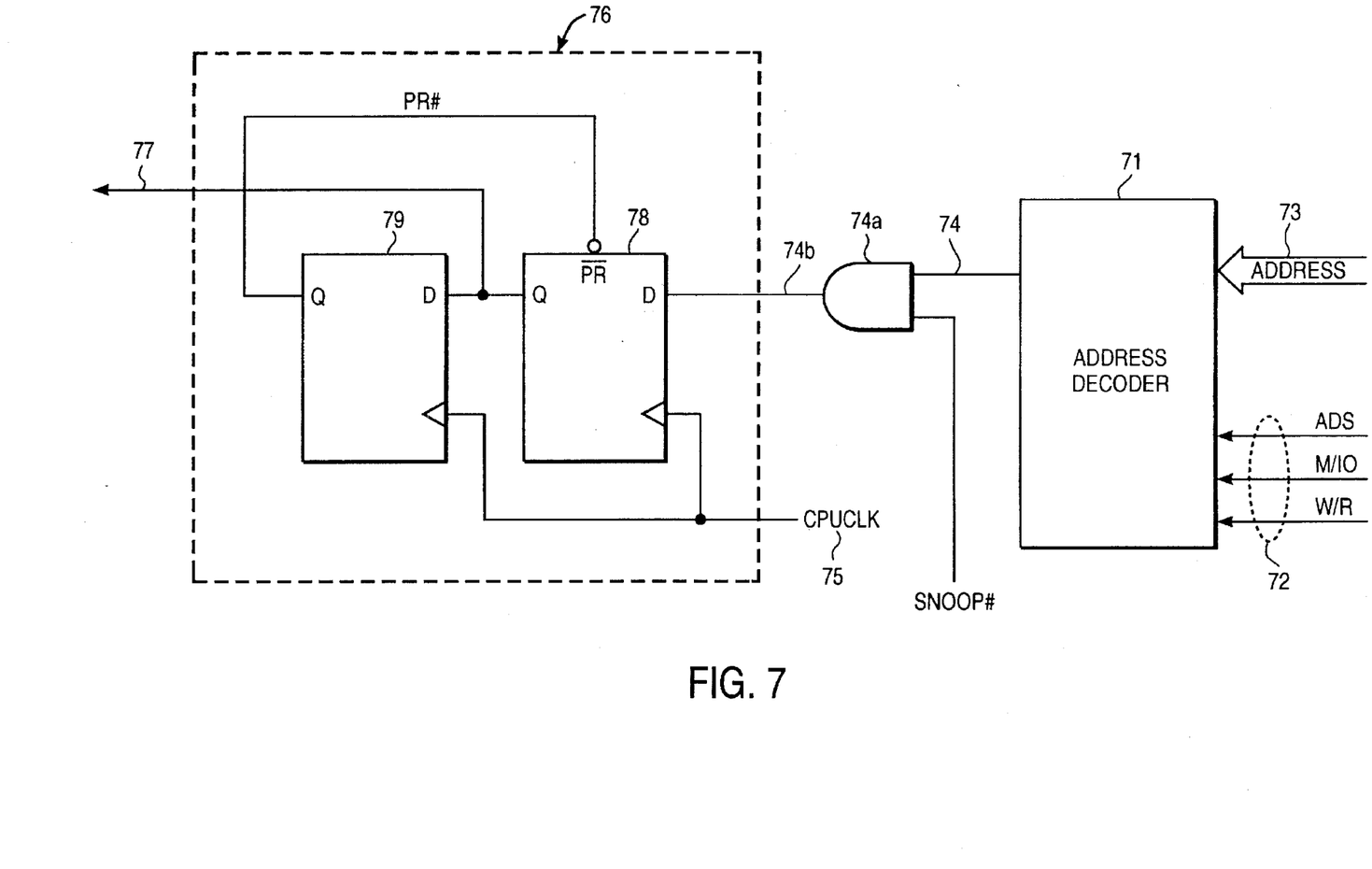
FIG. 7 is a circuit diagram of a cache disable device in accordance with a second embodiment of the present invention.

Referring to FIGS. 2, 3B, and 7, in order to generate a disable signal 77 (EADS#) as used in the above-described second method, a second embodiment of a microprocessor system 30 must include the following elements:

1. A shadow control device 35 which performs the steps necessary to copy the firmware 26 from the ROM 32 to the system memory device 31 in accordance with the conventional shadowing method 23;

2. A CPU 34 which copies some of the firmware 26 from the system memory device 31 to the cache RAM 33 by using the conventional cache RAM method 25; and 3. A disable signal device 39B which determines whether a request has been made to write into the shadow portion of the system memory device 31 (i.e., into the address range A+1 to B), and if a request has been so made, generates a disable signal 77 to prevent the writing of data into the cache RAM 33.

Details of the preferred embodiment of the above-mentioned disable signal device 39B are shown in FIG. 7.

Control bus 72 contains an address state signal (ADS#), a signal (M/IO#) for distinguishing between memory and input/output operations, and a signal (W/R#) for distinguishing between write and read operations. The address bus 73 carries address signals. The address bus 73 and the control bus 72 are both input into an address decoder 71, which is constructed from a programable array logic (PAL) device. The address decoder 71 generates decoding signal 74 which is active when address decoder 71 detects that a write to the shadow range (i.e., from address A+1 to B) of the system memory device 31 is being attempted.

The decoding signal 74 is fed into an AND gate 74A. The other input of the AND gate 74A comes from the monitor function monitoring signal (SNOOP#) which is required by the other system circuit modules. The output of AND gate 74A is control signal 74B. Control signal 74B is fed to a signal adjustment device 76.

Signal adjustment device 76 includes a first flip-flop 78 and a second flip-flop 79, connected as shown in FIG. 7. It accepts, as inputs, the control signal 74B and the CPU clock signal 75, and generates the disable signal 77 (EADS#) which meets the timing specifications of the CPU 34. When it is active, the disable signal 77 prevents the CPU 34 from writing any data to cache RAM 33.

Figure 6:
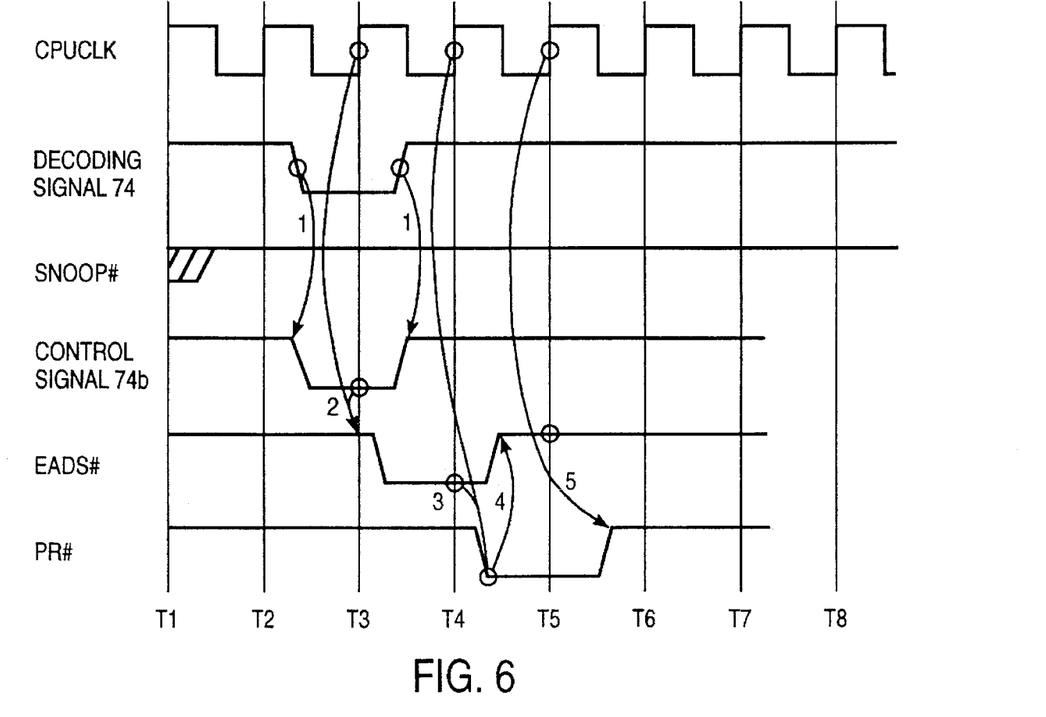
FIG. 6 is a timing diagram showing the signals generated by a cache disable device in accordance with a second embodiment of the present invention.

The signals generated by the signal adjustment device 76 are shown in FIG. 6, and will now be described. When the control signal 74B is inactive it has a high value which is clocked into the first flip-flop 78 and then the second flip-flop 79. As long as both the control decoding signal 74 and the monitor function signal (SNOOP#) remain high, the control signal 74B will remain high, causing the output of both flip-flops 78 and 79 to remain high. The output of the first flip-flop 78 is taken as the disable signal 77 (EADS#), and is inactive when it has a high value.

When the address decoder 71 detects a write to the shadow range (i.e., from address A+1 to B) of the system memory device 31, decoding signal 74 goes low, causing the output 74B of the AND gate 74A to go low as well. This is shown occurring between times T2 and T3 in FIG. 6. At the next rising edge of the CPU clock signal 75 (T3 in FIG. 6), the value of the control signal 74B is clocked into the first flip-flop 78, causing its output, the disable signal 77 (EADS#) to also go low. This is shown as occurring just after time T3 in FIG. 6.

At some time after T3 but before T4, the decoding signal 74 rises (goes inactive), causing the control signal 74B to rise also.

At the next rising edge of the CPU clock signal 75 (at time T4 in FIG. 6), the low output of EADS# 77 is clocked into the second flip-flop 79, causing its output, PR#, also to go low. This PR# signal is fed to the preset input of the first flip-flop 78, causing its output, EADS# 77, to rise immediately. This is shown between times T4 and T5 in FIG. 6. At the next rising edge of CPU clock 75 (T5 in FIG. 6), the high value of EADS# 77 is clocked into the second flip-flop 79, causing its output PR#, to go high. At the same time, the high value of control signal 74B is clocked into the first flip-flop 78, so that its output, EADS# 77, remains high. The output of both flip-flops 78 and 79 remain high until the next time the control signal 74B drops to a low value.

What is claimed is:

1. A system for caching firmware stored within a ROM, comprising:

a shadow processing device for copying said firmware stored within said ROM to a shadow region of a system memory device;

a cache RAM coupled to said system memory device for storing a portion of said copied firmware, which was stored within said shadow region, for subsequent access therefrom; and a flush device coupled to said cache RAM, said flush device identifying a write request having an address corresponding to that of said shadow region and generating a flush signal for flushing said cache RAM in response to said write request;

wherein said flush device comprises an address decoder which has as inputs an address state signal, an "M/IO" signal for distinguishing between memory and input/output operations, and an address signal, said address decoder generating a decoding signal which is active whenever an attempt is made to write into said shadow region, and a signal adjustment device which has as inputs said decoding signal and a CPU clock signal, said signal adjustment device generating a flush signal that matches timing specifications of a cache control device, for flushing said portion of said copied firmware in said cache RAM; and wherein said signal adjustment device includes a first flip-flop whose input is said decoding signal, a second flip-flop whose input is an output of said first flip-flop, and an AND gate whose inputs are said output of said first flip-flop and an output of said second flip-flop, said AND gate producing as its output said flush signal.

2. The system of claim 1 wherein said address decoder comprises a programmable array logic (PAL) device.

3. A system for caching firmware stored within a ROM, comprising:

a shadow processing device for copying said firmware stored within said ROM to a shadow region of a system memory device;

a cache RAM coupled to said system memory device for storing a portion of said copied firmware, which was stored within said shadow region, for subsequent access therefrom; and a disabling device coupled to said cache RAM, said disabling device identifying a write request having an address corresponding to that of said shadow region and generating a disable signal for disabling all writes to said cache RAM in response to said write request;

wherein said disabling device comprises an address decoder which has as inputs an address state signal, an "M/IO" signal for distinguishing between memory and input/output operations, a "R/W" signal for distinguishing between read and write operations, and an address signal, said address decoder generating a decoding signal which is active whenever an attempt is made to write into said shadow region of said system memory device, an AND gate device with a first input terminal which receives the decoding signal, and a second input terminal which receives a monitoring function monitoring signal, said AND gate generating a control signal, and a signal adjustment device which has as inputs said control signal and a CPU clock signal, said signal adjustment device generating said disable signal, said disable signal matching timing specifications of a cache control device for disabling a write to said cache RAM; and wherein said signal adjustment device includes a first flip-flop whose input is said control signal, and a second flip-flop whose input is an output of said first flip-flop, said second flip-flop producing as its output said disable signal.

4. The system of claim 3 wherein said address decoder comprises a programmable array logic (PAL) device.

5. A system for caching firmware stored within a ROM, comprising:

a shadow processing device for copying said firmware stored within said ROM to a shadow region of a system memory device;

a cache RAM coupled to said system memory device for storing a portion of said copied firmware, which was stored within said shadow region, for subsequent access therefrom; and a flush device coupled to said cache RAM having an address decoder which has as inputs an address state signal, an "M/IO" signal for distinguishing between memory and input/output operations, and an address signal, said address decoder generating a decoding signal which is active whenever an attempt is made to write into said shadow region, and a signal adjustment device having a first flip-flop whose inputs are said decoding signal and a CPU clock signal, a second flip-flop whose input is an output of said first flip-flop and an AND gate whose inputs are said output of said first flip-flop, and an output of said second flip-flop, said AND gate producing as its output a flush signal for flushing said cache RAM.

6. The system of claim 5 wherein said address decoder comprises a programmable array logic (PAL) device.

7. A system for caching firmware stored within a ROM, comprising:

a shadow processing device for copying said firmware stored within said ROM to a shadow region of a system memory device;

a cache RAM coupled to said system memory device for storing a portion of said copied firmware, which was stored within said shadow region, for subsequent access therefrom;

a disabling device coupled to said cache RAM, having an address decoder which has as inputs an address state signal, an "M/IO" signal for distinguishing between memory and input/output operations, a "R/W" signal for distinguishing between read and write operations, and an address signal, said address decoder generating a decoding signal which is active whenever an attempt is made to write into said shadow region of said system memory device;

an AND gate device with a first input terminal which receives the decoding signal, and a second input terminal which receives a monitoring function monitoring signal, said AND gate generating a control signal; and a signal adjustment device having a first flip-flop which has as inputs said control signal and a CPU clock signal, a second flip-flop whose input is an output of said first flip-flop, said second flip-flop producing as its output a disable signal for disabling a write to said cache RAM.

8. The system of claim 7 wherein said address decoder comprises a programmable array logic (PAL) device.

* * * * *